United States Patent
Montalvo

(10) Patent No.: US 7,350,232 B1
(45) Date of Patent: Mar. 25, 2008

(54) SYSTEM FOR SECURE COMMUNICATIONS

(75) Inventor: Armando Montalvo, Woodland Hills, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 1610 days.

(21) Appl. No.: 09/688,609

(22) Filed: Oct. 13, 2000

(51) Int. Cl.
*G06F 9/00* (2006.01)
*G06F 15/16* (2006.01)
*G06F 17/00* (2006.01)

(52) U.S. Cl. .............................. 726/12; 726/11; 726/14
(58) Field of Classification Search ................ 713/201, 713/151, 182; 709/217; 340/506; 380/270
See application file for complete search history.

(56) References Cited

U.S. PATENT DOCUMENTS

| | | | | |
|---|---|---|---|---|
| 5,625,363 A | * | 4/1997 | Spilker | 342/352 |
| 5,940,515 A | * | 8/1999 | Kasavaraju | 380/270 |
| 6,002,916 A | * | 12/1999 | Lynch | 455/13.1 |
| 6,246,320 B1 | * | 6/2001 | Monroe | 340/506 |
| 6,385,647 B1 | * | 5/2002 | Willis et al. | 709/217 |
| 6,578,145 B1 | * | 6/2003 | Greene | 713/182 |
| 2002/0032853 A1 | * | 3/2002 | Preston et al. | 713/151 |

* cited by examiner

*Primary Examiner*—Ayaz Sheikh
*Assistant Examiner*—Arezoo Sherkat

(57) ABSTRACT

A system and method for secure communications 18 uses a satellite 12 or other central processor with the ability to integrate information from all layers 22 of communications into a security control plane 20. These layers may include, but are not limited to, an application layer, a presentation layer, a session layer, a transport layer, a network layer, a data link layer, and a physical layer. Security control plane 20, in conjunction with station 14 (such as a ground gateway) containing security information, can be used to form the equivalent of a virtual biological fluid 40 which can be used to detect and protect against intrusion. This also enables the present invention to use an interactive security doctrine that allows for multiple levels of security deployment, based on the level of threat, as observed on many biological systems.

9 Claims, 1 Drawing Sheet

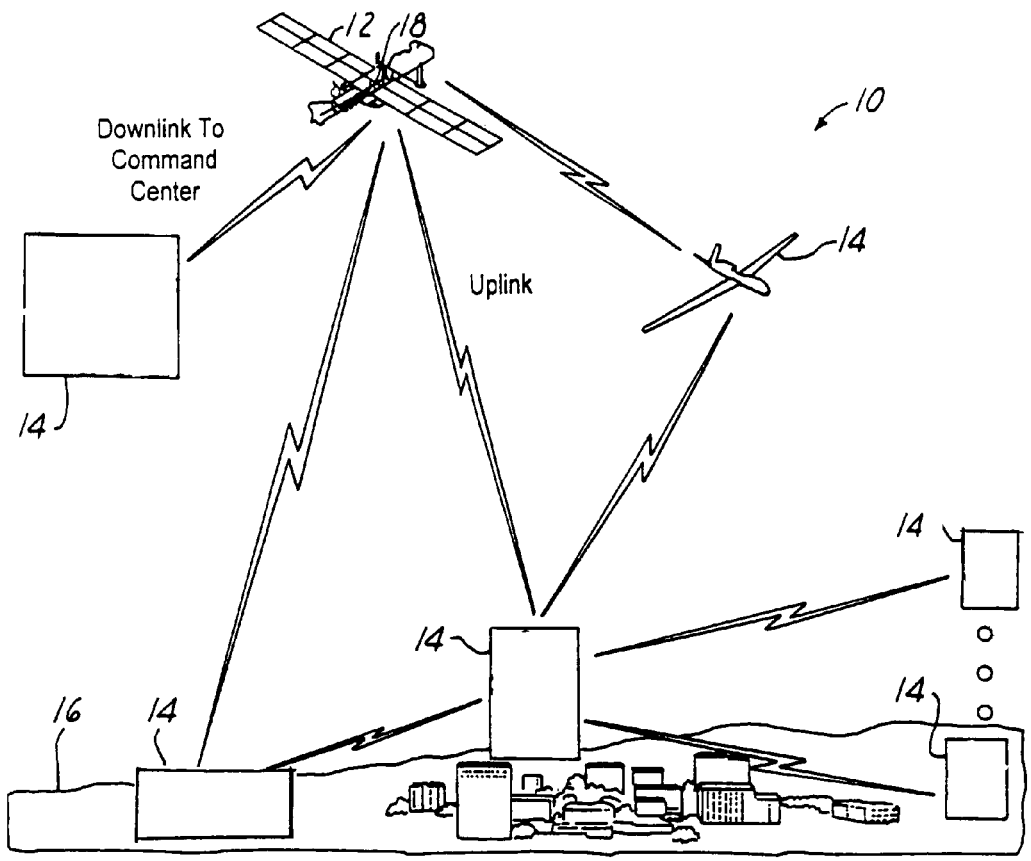
FIG. 1
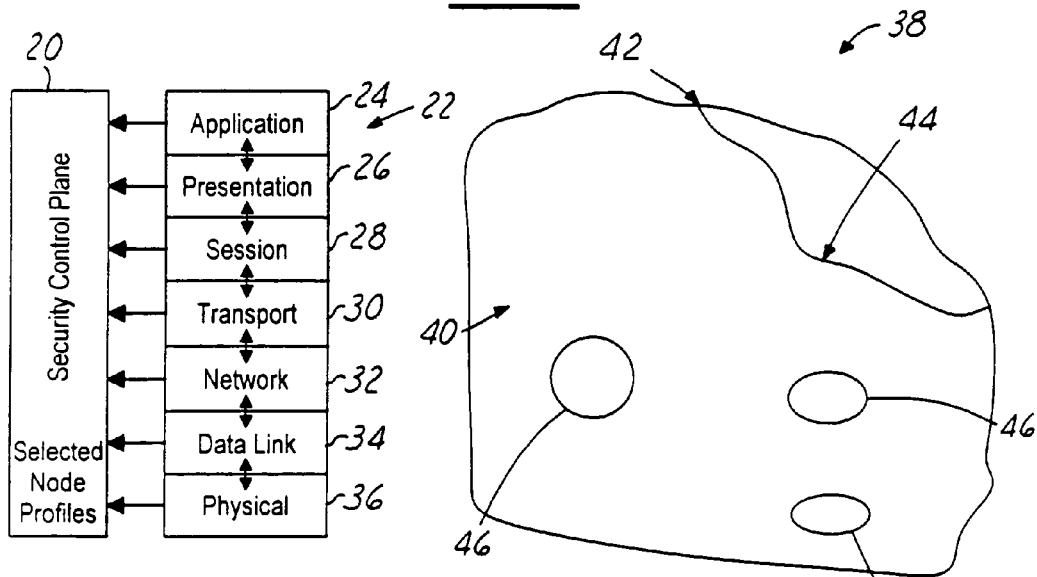
FIG. 2
FIG. 3

SYSTEM FOR SECURE COMMUNICATIONS

TECHNICAL FIELD

The present invention relates generally to communication systems, and more particularly, to systems for secure communications including satellite-based, computer-based and cell-phone systems.

BACKGROUND ART

Privacy concerns have increased as the use of computer-based communication (i.e., e-mail), cell phones and satellite-based communication systems have increased in comparison to traditional cable-based telephone networks. Cell phone communications are noticeably vulnerable to interference with other cell phone communications and eavesdropping. Computer-based communication (PCS and internet) is particularly susceptible to computer viruses. Without having a satellite system for secure communications, proper transmission of data is hindered and at times impossible.

Many communications systems use some form of security. These typical security systems generally use cryptography, or data encoding, in combination with a 'key' to insure secure communications. Unfortunately, this approach to security does not completely protect against eavesdropping and data gathering and post processing. Additionally, conventional security techniques cannot detect a breach in security and may allow for computation sharing for key acquisition. These problems become even more exacerbated in a wireless mobile environment.

To overcome some of these problems, conventional secure communications for wired fixed networks use a variety of security protocols. Among these protocols is the usage of fire-walls, authentication procedures, encapsulated payload and subnet procedures, distributed firewalls, key management and distribution, as well as I/O certificate distributions. Unfortunately, these protocols can be defeated on an individual basis and are especially vulnerable in the case of wireless communications because of the ease of data stream interception. For example, once an intruder gets through a rigid firewall, typical security systems are unable to detect possible intruder actions.

The disadvantages associated with conventional secure communications techniques have made it apparent that a new technique for secure communications is needed. The new technique should be able to integrate information from all layers of communications into a secure control plane more effective than any individual security protocol. Additionally, the new technique should allow for multiple levels of security deployment, based on the level of threat. The present invention is directed to these ends.

SUMMARY OF THE INVENTION

The fields of biology and medicine have shed light on how viruses intrude and attack healthy cells and how such virus attacks can be detected and prevented and how healthy cells can be protected. The present invention draws upon these totally non-analogous fields and applies lessons learnt to the field of communication. The present invention contemplates integrating information from all layers of communications into a secure control plane more effective than any individual security protocol, thereby providing an improved and reliable secure communication system for various networks such as computer/e-mail, cell-phones and satellite-based communication systems.

In one embodiment of the invention, a system for secure communications 18 uses a satellite with the ability to integrate information from all layers of communications into a security control plane. These layers may include, but are not limited to, an application layer, a presentation layer, a session layer, a transport layer, a network layer, a data link layer, and a physical layer. The security control plane, in conjunction with a station (such as a ground gateway) containing security information, can be used to form the equivalent of a 'biological fluid' that can act as a sensor of intruder movements and actions. This also enables the present invention to use an interactive security doctrine that allows for multiple levels of security deployment, based on the level of threat, as observed on many biological systems.

The present invention thus achieves an improved system for secure communications. The present invention is advantageous in that it allows for multiple levels of security deployment, based on the level of threat.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which the invention as used in a satellite-based communication system is illustrated. It should be understood, however, that the invention is not limited to satellite-based communication systems and is also applicable to other types of communication networks as discussed earlier.

FIG. 1 is a satellite system for secure communications in accordance with one embodiment of the present invention;

FIG. 2 is a security control plane in accordance with one embodiment of the present invention; and FIG. 3 is a biological analog model in accordance with one embodiment of the present invention.

DETAILED DESCRIPTION OF THE INVENTION

In the following figures, the same reference numerals will be used to identify identical components in the various views. The present invention is illustrated with respect to a satellite system for secure communications, particularly suited for the aerospace field. However, the present invention is applicable to various other uses that may require data transmission integrity. The present invention draws upon the fields of biology and medicine to develop a way to detect and protect against intrusion by 'viruses' and phrases such as "biological fluid" and "cells" are used to highlight this conceptual analogy. It should be understood, however, that the "biological fluid" of the present invention is not really a fluid in the conventional sense but is a conceptual 'virtual' fluid.

Referring to FIG. 1, a perspective view of a satellite system for secure communications 10 in accordance with one embodiment of the present invention is illustrated. The satellite system for secure communications 10 is comprised of one or more satellites 12 in communication with one or more users 14 located on the Earth 16. Each satellite 12 contains a system for secure communications 18 to insure private data communications.

The satellite system for secure communications 10 is responsible for preventing a security breach in data transmission. Many communication systems use some form of security. These typical security systems generally use cryptography, or data encoding, in combination with a 'key' to insure secure communications. Unfortunately, this approach to security does not protect against eavesdropping and data gathering and post processing. Additionally, conventional security techniques can not detect a breach in security and may allow for computation sharing for key acquisition. These problems become even more exacerbated in a wireless mobile environment.

Referring to FIG. 2, a security control plane 20 in accordance with one embodiment of the present invention is illustrated. The core of the system for secure communications 18 is the usage of satellite 12 with the ability to integrate information from all layers 22 of communications into a security control plane 20. These layers may include, but are not limited to, an application layer 24, a presentation layer 26, a session layer 28, a transport layer 30, a network layer 32, a data link layer 34, and a physical layer 36.

Referring to FIG. 3, a biological analog model 38 in accordance with one embodiment of the present invention is illustrated.

Security control plane 20, in conjunction with station 14 (such as a ground gateway) containing security information, can be used to form the equivalent of "biological fluid" 40 which can be used to develop intrusion detection techniques. This also enables the present invention to use an interactive security doctrine that allows for multiple levels of security deployment, based on the level of threat, as observed on may biological systems.

Biological analog model 38 includes a first flexible wall 42 having minimum protection. As additional protection is required, model 38 may include a second flexible wall 44. Virtual biological fluid 40 acts as a sensor of intruder movements and actions and includes one or more "cells" 46.

Cells 46 act as security processors as well as communication nodes. Because of the flexible nature of walls 42 and 44, the present invention is capable of using constructive key management and distribution. Also, authentication of a user is based on user profile and user behavior, while recognized I/Os are all available.

Satellite 12 acts as a dual usage node in a mobile wireless network. During the deployment and retraction of the network, the primary mission of satellite 12 is that of a security agent, while during regular operations the primary mission of the satellite is communications with security as a secondary mission on a demand basis. While acting primarily as a security agent, the satellite 12 will use information from all layers 24 of communications to form a security control plane 20. This security control plane 20, in conjunction with security information kept at a primary gateway 14 will make the core of the "biological fluid" 40 required to implement security protocols that mimic those encountered on biological systems.

This represents a radical departure from conventional approaches used to develop protocols for secure communication. Conventional approaches are rigid and unable to provide rapid detection and reaction in proportion to the level of attack. This is primarily because such conventional approaches were developed for wired and fixed communication networks, where the topology of the network is fixed and known and tapping into the network involves the actual physical connection to a wire. Extension of these conventional security protocols to the wireless-mobile environment has proven to be inadequate.

The method and system of the present invention provides for a new security technique capable of integrating information from all layers of communications into a secure control plane more effective than any individual security protocol. Additionally, the present invention allows for multiple levels of security deployment, based on the level of threat.

From the foregoing, it can be seen that there has been brought to the art a new and improved satellite system for secure communications. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A virtual biological fluid system for secure communications, said system comprising:
   a plurality of communication layers, and
   a security control plane coupled to and formed using information from each of said plurality of communications layers, whereby said security control plane in conjunction with said security information forms a virtual biological fluid insuring secure data transmission;
   a primary gateway having security information, wherein at least one station is in communication with said primary gateway;
   a satellite in orbit and in communication with said primary gateway and said at least one station, and said security control plane is on board said satellite.

2. The system as recited in claim 1, wherein at least one of said plurality of communication layers is an application layer.

3. The system as recited in claim 1, wherein at least one of said plurality of communication layers is a presentation layer.

4. The system as recited in claim 1, wherein at least one of said plurality of communication layers is a session layer.

5. The system as recited in claim 1, wherein at least one of said plurality of communication layers is a transport layer.

6. The system as recited in claim 1, wherein at least one of said plurality of communication layers is a network layer.

7. The system as recited in claim 1, wherein at least one of said plurality of communication layers is a data link layer.

8. The system as recited in claim 1, wherein at least one of said plurality of communication layers is a physical layer.

9. A method for secure communications over a network, said method comprising the steps of:
   generating security data;
   forming a security control plane using information from each of a plurality of communication layers, said security control plane coupled to said plurality of communication layers;
   forming a virtual biological fluid using said security control plane in communication with said security data, whereby secure data transmission between a ground gateway and a station may occur, wherein said security control plane is on board a satellite in orbit, in communication with said ground gateway and said station; and
   communicating secure data between said ground gateway and said station.

* * * * *